(12) United States Patent
Rosenkranz

(10) Patent No.: US 7,950,885 B2
(45) Date of Patent: May 31, 2011

(54) FASTENING ELEMENT

(75) Inventor: Falk Rosenkranz, Wildhaus (CH)

(73) Assignee: Hilti Aktiengesellschaft, Schaan (LI)

( * ) Notice: Subject to any disclaimer, the term of this patent is extended or adjusted under 35 U.S.C. 154(b) by 144 days.

(21) Appl. No.: 11/880,211

(22) Filed: Jul. 19, 2007

(65) Prior Publication Data

US 2008/0019793 A1 Jan. 24, 2008

(30) Foreign Application Priority Data

Jul. 21, 2006 (DE) .................. 10 2006 000 363

(51) Int. Cl.
*F16B 1/00* (2006.01)
(52) U.S. Cl. .................. 411/82.2; 411/258; 411/914
(58) Field of Classification Search ............... 411/82.2, 411/258, 914
See application file for complete search history.

(56) References Cited

U.S. PATENT DOCUMENTS

| | | | | |
|---|---|---|---|---|
| 2,989,107 A * | 6/1961 | James et al. | | 411/301 |
| 3,251,708 A * | 5/1966 | Schmetterer et al. | | 428/418 |
| 3,276,031 A * | 9/1966 | Gaynor | | 430/50 |
| 3,568,746 A | 3/1971 | Faroni et al. | | |
| 3,737,355 A * | 6/1973 | Epstein et al. | | 156/293 |
| 3,746,068 A | 7/1973 | Deckert et al. | | |
| 3,784,435 A * | 1/1974 | Bagheri et al. | | 156/293 |
| 3,787,222 A * | 1/1974 | Duffy | | 427/195 |
| 3,814,156 A * | 6/1974 | Bachmann et al. | | 411/258 |
| 3,831,213 A * | 8/1974 | Bedi | | 470/11 |
| 3,893,496 A | 7/1975 | Wallace et al. | | |
| 4,397,974 A * | 8/1983 | Goyert et al. | | 524/143 |
| 4,527,932 A * | 7/1985 | Onasch et al. | | 411/411 |
| 4,545,712 A * | 10/1985 | Wallace | | 411/258 |
| 4,904,136 A * | 2/1990 | Matsumoto | | 411/82.2 |
| 4,973,210 A * | 11/1990 | Osborne et al. | | 411/389 |
| 4,987,714 A * | 1/1991 | Lemke | | 52/410 |
| 5,249,898 A * | 10/1993 | Stepanski et al. | | 411/82.2 |
| 5,417,776 A * | 5/1995 | Yoshino et al. | | 148/318 |
| 5,452,977 A * | 9/1995 | Terrizzi | | 411/82.5 |
| 5,460,875 A * | 10/1995 | Yoshino et al. | | 428/332 |
| 5,750,268 A * | 5/1998 | Mace et al. | | 428/475.8 |
| 5,885,041 A * | 3/1999 | Giannuzzi et al. | | 411/82 |
| 6,164,887 A * | 12/2000 | Palm | | 411/387.7 |
| 6,338,600 B2 * | 1/2002 | Friederich et al. | | 411/424 |
| 6,484,471 B2 * | 11/2002 | Steed et al. | | 52/704 |
| 6,729,819 B2 * | 5/2004 | Wallace | | 411/11 |
| 7,070,376 B1 * | 7/2006 | Toback | | 411/82.2 |
| 2003/0216509 A1 * | 11/2003 | Goethel et al. | | 525/70 |
| 2004/0005207 A1 * | 1/2004 | Wallace | | 411/428 |
| 2005/0236728 A1 | 10/2005 | Maletzko et al. | | |
| 2006/0133908 A1 * | 6/2006 | Kunz et al. | | 411/21 |

FOREIGN PATENT DOCUMENTS

DE         0243537         3/2004

OTHER PUBLICATIONS http://www.indianplasticportal.com.*
European Search Report.

* cited by examiner

*Primary Examiner* — Shane Bomar
*Assistant Examiner* — Roberta Delisle
(74) *Attorney, Agent, or Firm* — Abelman, Frayne & Schwab

(57) ABSTRACT

A fastening element for mineral constructional components has a shaft (12) provided with a tapping thread (14) extending, at least regionwise, along the shaft (12), and a coating (21) that covers the shaft (12) likewise at least regionwise and that is formed of a polar thermoplast.

8 Claims, 1 Drawing Sheet

US 7,950,885 B2

FASTENING ELEMENT

BACKGROUND OF THE INVENTION

1. Field of the Invention

The present invention relates to a fastening element for mineral constructional components and including a shaft having rotatable application means, a tapping thread extending, at least regionwise, along the shaft, and a coating provided on the shaft, at least regionwise.

2. Description of the Prior Art

German Publication DE 102 43 537 A1 discloses a fastening element for mineral constructional components and having a shaft. At one end of the shaft, there is provided, e.g., a hexagonal head as a rotatable application means, for a setting tool, and a tapping thread that extends, starting from the shaft end opposite the rotatable application means, along the shaft at least regionwise. The shaft is provided, regionwise, with a coating of eleastomeric material. The strength of the coating is so selected that upon screwing of the fastening element in, it becomes partially compressed sealing the intermediate space between the core of the fastening element and the borehole wall. This fastening element can be unscrewed, without parts of the provided coating remaining in the constructional component.

The drawback of the proposes solution consists in that for setting a fastening element with an elastomeric coating high screw-in torques are necessary which exceed power limits of a number of screw-driving power tools or even the torsional strength of a fastening element. Because the preliminary formed borehole has a round cross-section only in theory, sealing of the borehole is not ensured at each application. The connection between the elastoemeric coating and the core of the fastening element can be broken by loss of adhesion to the threaded surface. As a result, not at each application, a high bearing capacity is ensured by the coating. Further, the deformation of the elastomeric coating leads to generation of expanding forces in the gap which can lead, in particular in the region of the borehole mouth and at small edge and axial distances of the fastening elements, to spalling on the surface of the constructional component.

Accordingly, an object of the present invention is to provide a thread-tapping fastening element that can be easily set and loaded immediately after setting.

Another object of the present invention is to provide a thread-tapping fastening element that has an increased bearing capacity in comparison with conventional thread-tapping fastening elements and can be easily unscrewed.

SUMMARY OF THE INVENTION

These and other objects of the present invention, which will become apparent hereinafter, are achieved by forming the coating of a polar thermoplast. The polar thermoplast ensures that the coating strongly adheres to the outer surface and, therefore, does not peel off from the fastening element during screwing-in as a result of loss of adhesion to the fastening element. Unexpectedly, it has been found out that the polar thermoplast or plastic material provide a thread-tapping fastening element with a plurality of desirable characteristics.

Upon the fastening element being screwed in, the coating heats up, whereby a limited, radially outer region, which would be further referred to as a melting region, becomes heated to a melting temperature of the polar thermoplast, which is favorable to an easy bonding of the coating with the wall of the borehole. Thereby, with the layer thickness adapted to the dimensions of the fastening element and the borehole, a complete sealing of the borehole against fluid media is ensured. The bonding of the coating with the wall of the borehole has little adhesive effect, so that a set fastening element can be removed later in a simple manner, without destroying the region of the constructional component that surrounds the fastening element. The borehole tolerances are directly compensated during the setting process. Further, the inventive fastening element has, in its setting condition, noticeably greater anchoring characteristic values in comparison with a non-coated fastening element and, thus, a greater bearing capacity. Simultaneously, the inventive fastening element ensures ruggedness of the setting process.

An essential advantage of the inventive thread-tapping fastening element is the possibility to remove it again from the constructional component, without a portion of the provided coating remaining in the constructional component. In particular, thread-tapping concrete screws, which are set in mineral constructional components, proved themselves in practice for temporary attachment, e.g., of formworks, scaffolding or for securing of drilling or cutting tools in the diamond drilling and separation technology. The thread-tapping fastening elements not only are removable but, in principle, can also be used for new applications. For this reason, the removability of the inventive fastening element is an important advantage of the inventive thread-tapping fastening element.

In order to ensure the sealing function and the increased bearing capacity, no material or chemical processes should occur upon setting. Because a physical simple process occurs, the set fastening element can be immediately loaded without waiting, e.g., for some time for hardening. The heated melting region of the coating is cooled within several minutes, so that the time for removing the setting tool and before the start of a further process is sufficient for the immediate loading of the just set, fastening element. Overhead mounting presents no problem during mounting of the inventive fastening element. In addition, contrary to filling of the borehole with a hardable mass, during setting of the inventive fastening element, no portion of a non-hardened mass is forced from the borehole and dirties the region surrounding the borehole.

Because no chemical process occurs, the environmental temperature has only a limited influence on the field of application of the inventive fastening element. The variations which are caused by hardening conditions, do not occur, and a perfect sealing of the borehole is insured. The additional frictional torque due to coating is small, and the screwing-in torque during setting of the fastening element increases only insignificantly in comparison with that during setting of an uncoated thread-tapping fastening element. Therefore, the screwing-in torque is smaller than the torsional strength of the fastening element and is smaller than the maximal torque of a conventional screw-driving tool such as, e.g., of a tangential percussion tool.

Contrary to the uncoated fastening elements, the inventive fastening element has no limitations regarding its fire fitness because the allowable bearing capacity of the inventive fastening element is determined by a thermally induced reduction of the strength of the shaft material such as, e.g., steel cross-section of the fastening element.

The fastening element according to the present invention can be practically stored without any limitations and can also be stored at high temperatures, without loosing its functionality.

Advantageously, the polar thermoplast is formed of ethylenvinylacetate (EVA) that has advantageous characteristics and resistance against a number of media which particular use in the constructional field. In addition ethylenvinylacetate is safe to use as it is used, e.g., as a packaging material in the food industry.

According to an embodiment of the invention, the polar thermoplast can be formed of a thermoplastic polyurethane (TPU). The thermoplastic polyurethane is characterized, in comparison with the ethylenvinylacetate, by low glass transitional temperatures. Therefore, the coating of thermoplastic polyurethane remains soft at low environmental and underground temperatures and, therefore, the coated fastening element is easily settable even at these conditions and ensures an adequate sealing of the borehole.

Advantageously, the polar thermoplast has a melting temperature of from 50° to 150° C. As a melting temperature in this connection is considered the temperature, at which the exethermal heat flow in the DSC (Differential Scanning Calorimetry) with 5K/min heating rate is maximal.

The low temperature threshold of 50° C. ensures that the coating even during storage at high temperatures, e.g., under the sun rays in a closed vehicle, does not melt. Thereby, bonding of the coated fastening elements during transportation and storage is largely prevented.

The upper temperature threshold of 150° C. is usually reached when the inventive fastening element is screwed in with a motor-driven screw-driving power tool such as a tangential percussion screw-driving tool into a borehole wall. As a result of softening of the melting region of the coating, which occurs when the fastening element is being screwed in, the coating is easily pressed into the intermediate space between the shaft and the borehole wall. In addition, integration of drilling dust, which is produced in the borehole during tapping of the counter-thread, into the coating is facilitated. This leads to reinforcement of the coating in the melting region after cooling of the coating, which further increases the bearing capacity of the obtained fastening. Further, this ensures an easily releasable bonding of the coating with the wall of the borehole.

It is particularly advantageous when the polar thermoplast has a melting temperature from 50° C. to 100° C. With the upper temperature threshold of 100° C., the inventive fastening element ensures desirable anchoring characteristic values when it is set at low environmental and/or underground temperatures, at which the friction temperatures that are obtained during the setting process, do not reach the value of 150° C.

When the melting temperature of the polar thermoplast, which is used as a coating material, is smaller than or equal to 150° C., the coating temperature of the coating process can be sufficiently low, so that the heating process does not reduce the hardness of steel necessary for tapping of a thread.

Preferably, the polar thermoplast has a strength of 2 N/mm$^2$ to 15 N/mm$^2$ at room temperature. Under the room temperature, a temperature of from 20° C. to 24° C. is understood. This strength range ensures that the excess material of the polar thermoplast would break off from the coating by cohesive peeling upon the fastening element being screwed into the borehole. The peel layer runs through the coating, whereby a portion of the coating, which is necessary for an adequate sealing of the borehole and for increase of the bearing capacity, remains bonded to the shaft due to the large polarity of the polar thermoplast. It is particularly advantageous when the polar thermoplast has a strength of 2 N/mm$^2$ to 10 N/mm$^2$ at room temperature.

The portion of the coating introduced into the borehole undergoes only minimal deformations so that no or only slight stresses occur in a direction transverse to the longitudinal axis of the fastening element. Thereby, small spaces between the axes and edges, e.g., of fastening elements coated with an elastomeric material are possible. Thereby, the risk of chunking of the material of the constructional component around the set fastening element in the region of the borehole mouth is reduced.

After the inventive fastening element has been set and the melting region of the coating has been cooled, the deformation of the polar thermoplast is practically prevented in all of the spatial directions. Thus, the small strength of the polar thermoplast does not adversely affect the produced attachment. When a force is applied to the polar thermoplast it reacts quasi hydrostatically and contributes to the transfer of load, which is applied to the fastening element, into the constructional component. Thereby, high anchoring characteristic values are realized.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

In the drawings, the same elements are designated with the same reference numerals.

DETAILED DESCRIPTION OF THE PREFERRED EMBODIMENT

Figure 1:
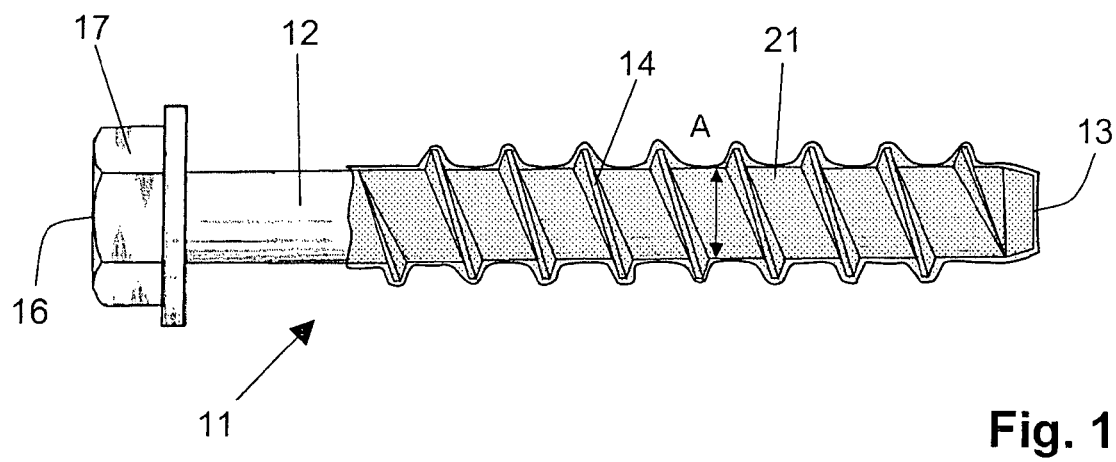
FIG. 1 a side view of a fastening element according to the present invention.

A fastening element 11 according to the present invention for a mineral constructional component 6, which is shown in FIG. 1, is formed as a self-tapping screw having a shaft 12 with a first, setting side end 13 and a second end 16 opposite or remote from the first end 13. At the second end 16, there is provided rotatable application means 17 in form of a hegonal screw head for a setting tool, not shown here. Starting from the first end 13 of the shaft 12, a thread-tapping thread 14 extends regionwise along the shaft 12. From the first end 13 in the direction of the second end 16, regionwise, the shaft 12 is provided with a coating 21 from a polar thermoplast. As a polar thermoplast, ethylenvinylacetate (EVA) is used that has a melting temperature according to DSC of 60° C. and a strength of 4 N/mm$^2$. The polar thermoplast is applied on the fastening element 11, at least in the region of the thread 14 by a whirl sintering process.

Figure 2:
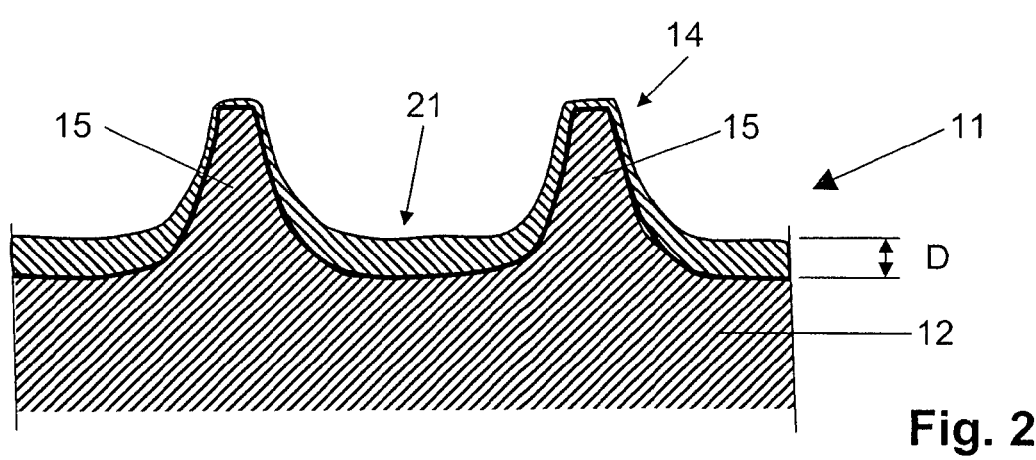
FIG. 2 a partial cross-sectional view showing a detail of the fastening element shown in FIG. 1.

As shown in FIG. 2, the coating 21 has a bell-shaped distribution between the threads 15, with a thickness of the coating 21 being greater between the threads 15 than on flanks of the thread 15. The free ends of the thread flanks need not necessarily be provided with the coating 21 because during tapping of the counter-thread in the constructional component 6, the coating 21 is completely removed. The thickness D of the coating 21 between the thread 15 amounts, for compensation of borehole tolerances, to about from 0.005 to 0.10 times the root diameter A of the shaft 12 in the region of the thread 14.

Figure 3:
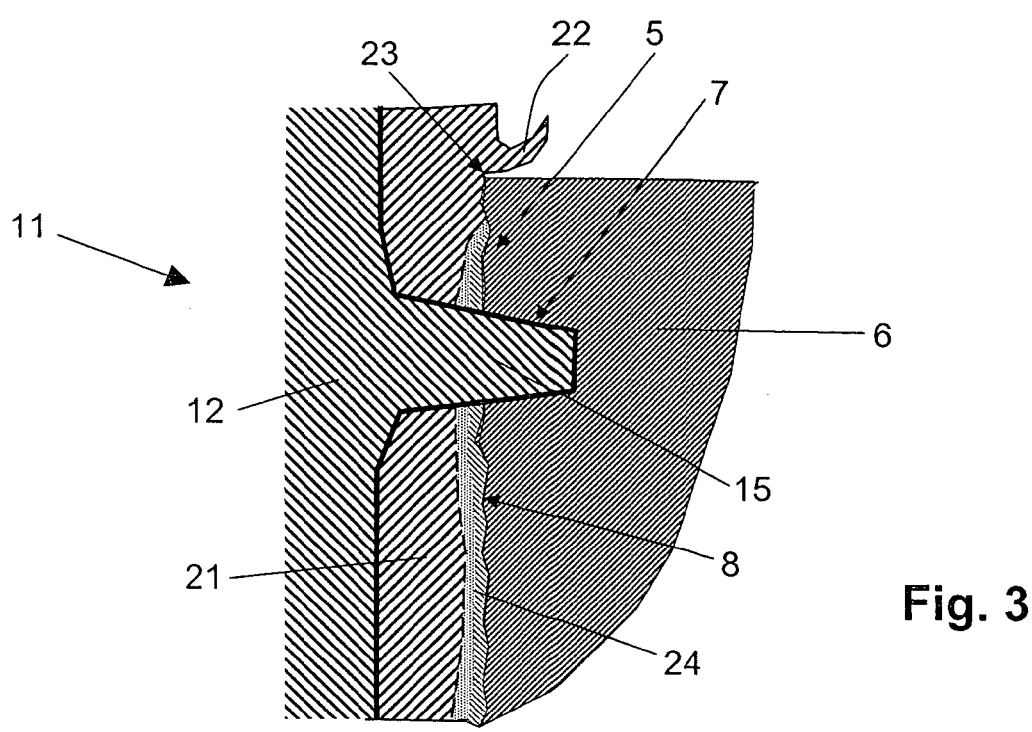
FIG. 3 a schematic cross-sectional view showing a detail of the fastening element shown in FIG. 1 in a set condition.

The functioning of the inventive fastening element 11 will be explained below based on FIG. 3. In the first step, a borehole 5 is formed in the constructional component 6. Then, the fastening element 11 is screwed into the borehole 5. During screwing of the fastening element 11 in the constructional component 6, the thread flanks penetrate into the constructional component, forming a counter-thread 7. Simultaneously, the surplus portion 22 of the coating 21 breaks off as a result of a cohesive peel of the polar thermoplast of the coating 21. Because of a low strength and a strong adhesion to the shaft 12 of the polar thermoplast, the peeling layer 23 flows through the coating 21. Due to the polarity of the polar thermoplast, a portion of the coating 21, which is necessary for a complete sealing of the borehole 5 against a fluid medium, still remains bounded to the shaft 12 even after the breaking off of the surplus portion 22.

During screwing-in, the coating 21 is heated due to friction between the coating 21 and the wall 8 of the borehole 5 in the radial outer melting region 24. The drilling dust, which is produced during tapping and which remains in the borehole 5, becomes spread in the melting region 24 of the coating 21, whereby the coating 21 becomes reinforced after cooling of the melting region 24, at least regionwise. In addition, the coating 21 easily and releasably bonds with the wall 8 of the borehole 5.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A fastening element for mineral constructional components (6), comprising
   a shaft (12) having rotatable application means (17);
   a tapping thread (14) extending, at least regionwise, along the shaft (12); and
   a coating (21) provided on the shaft (12), at least regionwise, and formed of a polar thermoplast having a melting temperature of from 50° C. to 150° C., and which ensures that the coating (21) is sufficiently strong to firmly adhere on an outer surface of the shaft (12), wherein the polar thermoplast has a strength at a room temperature of from 2 N/mm$^2$ to 15 N/mm$^2$.

2. A fastening element according to claim 1, wherein the polar thermoplast is a thermoplastic ethylenvinylacetate (EVA).

3. A fastening element according to claim 1, wherein the polar thermoplast is a thermoplastic polyurethane (TPU).

4. A fastening element according to claim 1, wherein the polar thermoplast has a melting temperature of from 50° C. to 100° C.

5. A fastening element for mineral constructional components (6), comprising
   a shaft (12) having rotatable application means (17);
   a tapping thread (14) extending, at least regionwise, along the shaft (12); and
   a coating (21) provided on the shaft (12), at least regionwise, and formed of a polar thermoplast having a melting temperature of from 50° C. to 150° C., and which ensures that the coating (21) is sufficiently strong to firmly adhere on an outer surface of the shaft (12), wherein the polar thermoplast has a strength at a room temperature of from 2 N/mm$^2$ to 10 N/mm$^2$.

6. A fastening element according to claim 5, wherein the polar thermoplast is a thermoplastic ethylenvinylacetate (EVA).

7. A fastening element according to claim 5, wherein the polar thermoplast is a thermoplastic polyurethane (TPU).

8. A fastening element according to claim 5, wherein the polar thermoplast has a melting temperature of from 50° C. to 100° C.

* * * * *